United States Patent [19]

Yamanaka

[11] Patent Number: 5,503,010
[45] Date of Patent: Apr. 2, 1996

[54] DIRECTIONAL ATOMIC FORCE MICROSCOPE AND METHOD OF OBSERVING A SAMPLE WITH THE MICROSCOPE

[75] Inventor: Kazushi Yamanaka, Tsukuba, Japan

[73] Assignees: Agency of Industrial Science & Technology; Ministry of International Trade & Industry, both of Tokyo, Japan

[21] Appl. No.: 338,179

[22] Filed: Nov. 9, 1994

[30] Foreign Application Priority Data

Nov. 9, 1993 [JP] Japan ................................ 5-303518

[51] Int. Cl.$^6$ .................................................. G01B 5/28
[52] U.S. Cl. ................................................................ 73/105
[58] Field of Search ............................. 73/105; 250/306, 250/307

[56] References Cited

U.S. PATENT DOCUMENTS 5,193,383  3/1993  Burnham et al. ......................... 73/105

OTHER PUBLICATIONS

Compact Stand–Alone Atomic Force Microscope, van der Werf et al., Oct. 1993, Rev. Sci. Instrum. 64(10), pp. 2892–2897.
Measuring the Nanomechanical Properties and Surface Forces of Materials Using an Atomic Force Microscope, Burnham et al., Jul./Aug. 1989, J. Vac. Sci. Technol. A., vol. 7, No. 4, pp. 2906–2913.
A Stand–Alone Scanning Force and Friction Microscope, Hipp et al., 1992, Ultramicroscopy, 42–44, pp. 1498–1503.
Simultaneous Measurement of Lateral and Normal Forces with an Optical–Beam–Deflection Atomic Force Microscope. Gerhard Meyer and Nabil M. Amer Nov. 12, 1990,
Appl. Phys. Lett. 57(20) pp. 2089–2091.
Scanning Microdeformation Microscopy. B. Cretin and F. Sthal Feb. 22, 1993, Appl. Phys. Lett. 62 (8) pp. 829–831.
Tunneling Acoustic Microscope. Keiji Takata, et al. Oct. 23, 1989, Appl. Phys. Lett. 55 (17) pp. 1718–1720.
Atomic–Scale Friction of a Tungsten Tip on a Graphite Surface. C. Mathew Mate, et al. Physical Review Letters, Oct. 26, 1987. vol. 59, No. 17. pp. 1942–1945.
Atomic Force Microscope Study of Boundary Layer Lubrication. S. J. O'Shea and M. E. Welland Nov. 2, 1992 Appl. Phys. Lett 61 (18), pp. 2240–2242.
From Molecules to Cells: Imaging Soft Samples with the Atomic Force Microscope. M. Radmacher, et al. Science, vol. 257, Sep. 25, 1992. pp. 1900–1905.
Using Force Modulation to Image Surface Elasticities with the Atomic Force Microscope. P. Maivald, et al. Nanotechnology 2 (1991) pp. 103–106.
Atomic Force Microscope–Force Mapping and Profiling on a Sub 100–A Scale. Y. Martin, et al. Appl. Phys. 61 (10), May 15, 1987. pp. 4723–4729.
Atomic Force Microscope. G. Binning, et al. Physiical Review Letters, vol. 56, No. 9, Mar. 3, 1986. pp. 930–933.

*Primary Examiner*—Hezron E. Williams
*Assistant Examiner*—Daniel S. Larkin
*Attorney, Agent, or Firm*—Oblon, Spivak, McClelland, Maier & Neustadt

[57] ABSTRACT

An atomic force microscope includes a vibrator which imparts vibration between a probe and a sample such that a relative vertical vibration and a relative lateral vibration are superimposed. A method of observing a sample with the microscope includes the steps of imparting phase-controlled vertical and lateral vibration between a sample and a probe so that the probe moves along a straight line or a ring relative to the sample, controlling the direction of the straight line or the ring, and measuring the amplitude and/or the phase of the bending vibration and/or the torsional vibration of a cantilever excited by the vibration.

9 Claims, 7 Drawing Sheets

FIG. 5(a) FIG. 5(b)  FIG. 5(c) FIG. 5(d)
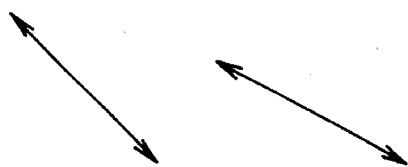
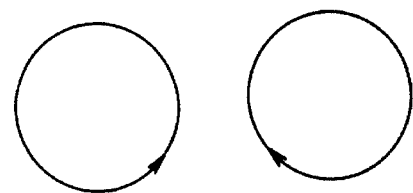
FIG. 5(e)  FIG. 5(f)
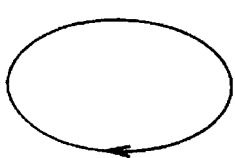
FIG. 6
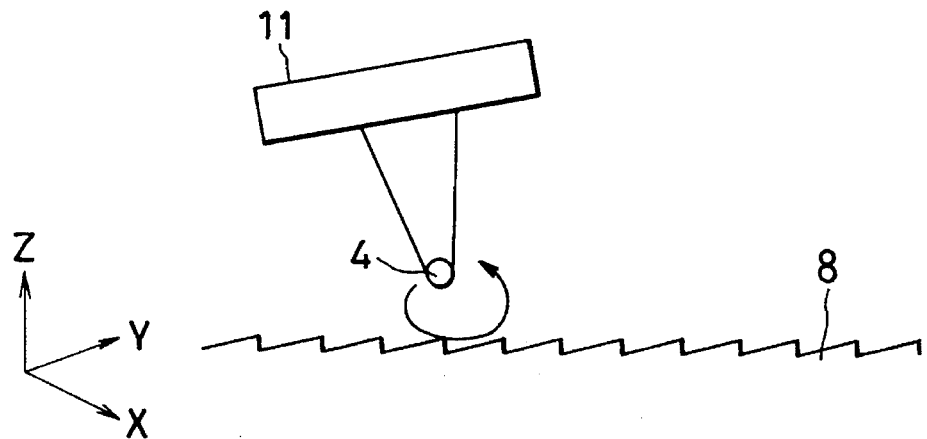

F I G. 14
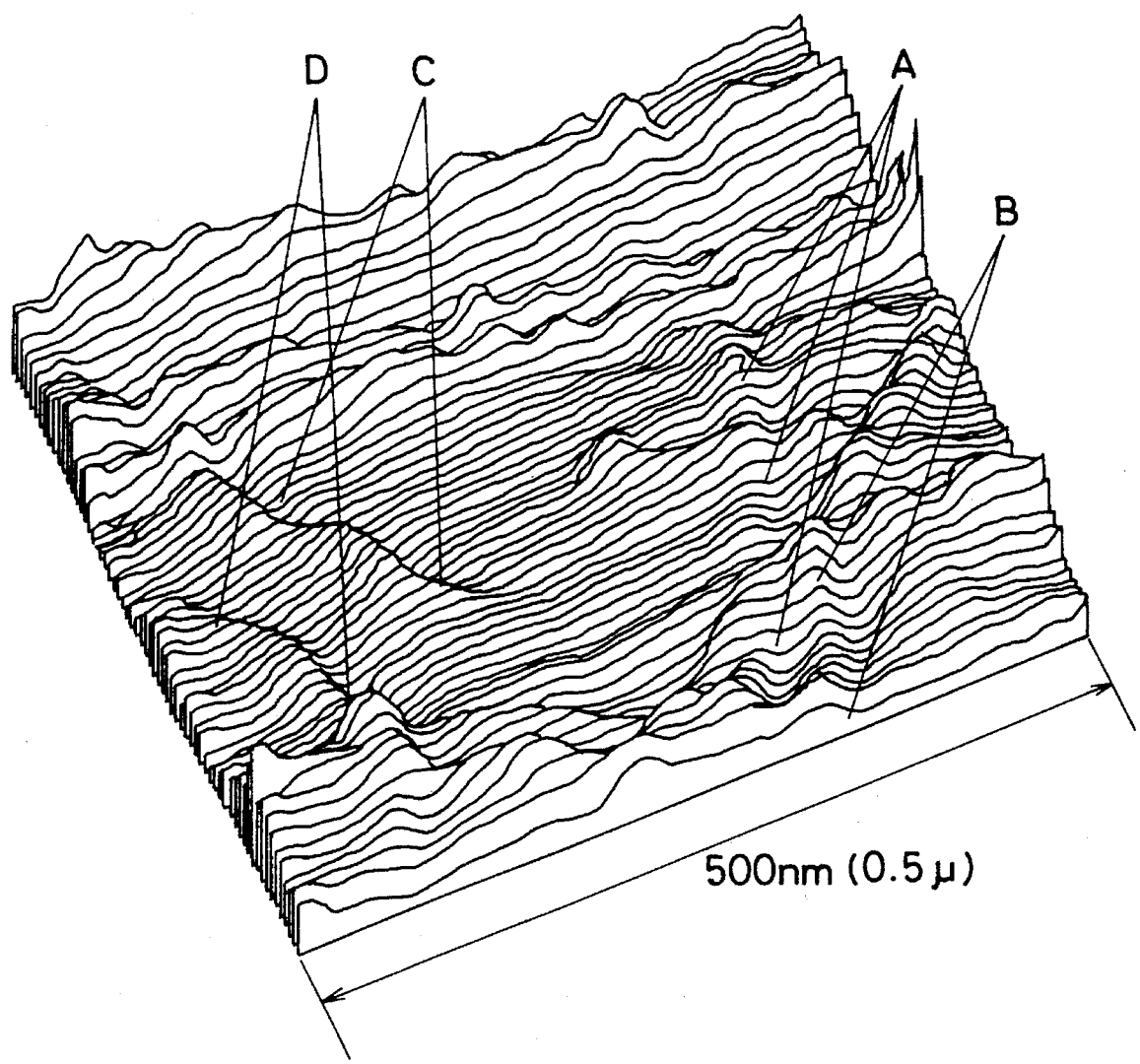

DIRECTIONAL ATOMIC FORCE MICROSCOPE AND METHOD OF OBSERVING A SAMPLE WITH THE MICROSCOPE

BACKGROUND OF THE INVENTION

1. Field of the Invention

This invention relates to a directional atomic force microscope and a method of observing a sample with the microscope.

2. Description of the Prior Art

The atomic force microscope (Binnig, Quate and Gerber, Phys. Rev. Lett. 12, 930, 1986) is a new type of microscope which images minute irregularities on the surface of a sample utilizing the deflection induced in a cantilever supporting a probe owing to the force acting between the sample surface and the probe. Using this atomic force microscope, Martin et al. developed a method for detecting the attractive force of a sample from the change in the resonant frequency of the cantilever when it is imparted with longitudinal vibration (Y. Martin, C. C. Williams, H. K. Wickramasinghe: J. Appl. Phys., 61(1987) 4723). On the other hand, Maivald et al. and Radmacher et al. developed a vibration atomic force microscope and measured the viscoelasticity of a sample from the vibration response of the cantilever when the sample was vibrated vertically. (P. Maivald, H. J. Butt, S. A. C Gould, C. B. Prater, B. Drake, J. A. Gurley, V. B. Elings, and P. K. Hansma: Nanotechnology 2(1991)103; and M. Radmacher, R. W. Tillmann, M. Fritz, and H. E. Gaub: Science, 257(1992)1900.) Further, Takata proposed a tunneling acoustic microscope of a type which, reverse from the foregoing, detects the vibration of the sample when vibration is imparted to the probe (K. Takata, T. Hasegawa, Sumio Hozaka, Shigeyuki Hosoku, Tsutomu Komoda: Appl. Phys. Lett. 55(1989)17). This was used by Cretin et al. (B. Cretin and P. Stahl Appl. Phys. Lett 62(1993)829) for imaging internal defects.

On the other hand, the friction force microscope (Mate, McClelland, Erlandsson and Chiang, Phys. Rev., Lett., 59, 1942, 1987) images the surface of a sample based on the frictional force determined by measuring the torsion produced in a cantilever by the frictional force between the sample surface and a probe. O'Shea et al. developed a lateral vibration friction force microscope which determines frictional force by applying lateral vibration to a sample and measuring the amplitude of the torsional vibration produced by a static frictional force. (S. J. O'Shea, E. Welland. App. Phys. Lett., 61, 2240, 1992). In this case, the vibration amplitude was held to a magnitude at which slipping did not occur so as to measure only the frictional force unaffected by surface irregularities. Although not mentioned by O'Shea et al., the time response of the frictional force can be evaluated by varying the vibration frequency in the lateral vibration friction force microscope.

In the vibration atomic force microscope and the tunneling acoustic microscope, the sample is subject only to forces produced normal thereto by the vertical vibration and, therefore, only voids and other internal structures which change the apparent elasticity in the vertical direction are imaged. However, cracks, delaminated portions of a coating and the like are not displaced unless a shearing force is added to the normal force. Moreover, as is for example seen in obliquely oriented liquid crystal a large compliance is often exhibited three-dimensionally in a specific direction.

The prior art vibration mode limited to the vertical direction is therefore inadequate when measurement is to be extended to such samples.

The vibration friction force microscope of O'Shea et al. measures frictional force using lateral vibration, in which case it is not possible to limit the friction to one direction by reversing the direction of the friction every half cycle. However, as Meyer et al. found using an ordinary friction force microscope, in the case of, for example, a crystal surface having continuous steps in a specific direction (G. Meyer and N. M. Amer, Appl., Phys., Lett. 57, 2089, 1990) or a crystal in which the molecules progressively overlap, the frictional force exhibits directional dependence, meaning that there are cases in which the frictional force obtained differs between the step ascending and descending directions. In such cases, the vibration friction force microscope has a problem in that it cannot detect the directional dependence of the frictional force.

This invention was accomplished in response to the foregoing circumstances and aims to overcome the aforesaid problems of the vibration atomic force microscope, tunneling acoustic microscope and vibration friction force microscope by providing a directional atomic force microscope capable of measuring frictional force in one direction, measuring shear elasticity and detecting and imaging the features of a sample which change these, of imaging internal structural features of a sample which easily deform in a specific direction, and of evaluating the viscoelastic behavior of a sample, and by providing a method of observing a sample with the atomic force microscope.

SUMMARY OF THE INVENTION

For achieving the aforesaid object, the invention provides an atomic force microscope equipped with a vibrator which imparts vibration between a probe and a sample such that a relative vertical vibration and a relative lateral vibration are superimposed. The invention further provides a method of observing a sample with an atomic force microscope which images irregularities at a minute region of a sample based on force acting between the sample and a probe, the method comprising the steps of imparting phase-controlled vertical and lateral vibration to one or both of a sample and a probe for producing vibration resulting in relative motion between the sample and the probe whose locus is a straight line or a ring, controlling the direction of the straight line or the major axis of the ring, and concurrently measuring one or both of the amplitude and the phase of one or both of the bending vibration and the torsional vibration of a cantilever excited by the vibration.

In the aforesaid invention, an oblique linear vibration, elliptical vibration or the like is produced between the sample and the probe by positioning a piezoelectric transducer under the sample for vibrating it vertically and laterally, and electrically imparting a phase difference to the drive signals for producing the vibrations. Alternatively, an oblique linear or elliptical vibration is produced between the sample and the probe by imparting high-frequency vertical and lateral vibration by use of, for example, an ultrasonic vibrator overlaid on the sample stage separately of the piezoelectric transducer. The composite vibration obtained by combining these vibrations produces obliquely directed linear motion or elliptical motion between the sample and the probe.

The bending vibration or torsional vibration of a cantilever excited by the sample vibration is then detected as the ac component of a signal from an optical vertical/lateral deflection detector divided into four (left, right, top, bottom) sectors, the amplitudes and phases of the bending vibration or the torsional vibration are measured using a lock-in amplifier or the like, and an image of the vibration distribution is obtained by recording the measurement results as the sample is scanned two-dimensionally.

When, in the foregoing manner, relative vertical and lateral vibrations are superimposed between the sample and the probe to produce a relative motion between the sample and the probe whose locus is a straight line or a ring and the response of the probe or sample is then observed, it becomes possible to image the coefficient of friction and slope of the sample in a specific direction, the modulus of elasticity of the sample in a specific direction, and internal defects, foreign substances and structural features of the sample.

The above and other objects, characteristic features and advantages of this invention will become apparent from the description given hereinbelow with reference to the accompanying drawings.

BRIEF EXPLANATION OF THE DRAWINGS

FIGS. 5(a), (b), (c), (d), (e) and (f) are diagrams for explaining the loci of relative motion between a sample and a probe when vibrational forces act thereon.

FIG. 6 is a diagram for explaining measurement of the friction of a sample subjected to vertical vibration in addition to lateral vibration.

FIG. 14 is a distribution diagram showing the amplitude of torsional vibration of the cantilever when high-frequency vertical vibration and low-frequency lateral vibration are imparted to a graphite single crystal sample.

DESCRIPTION OF THE PREFERRED EMBODIMENT

Figure 1:
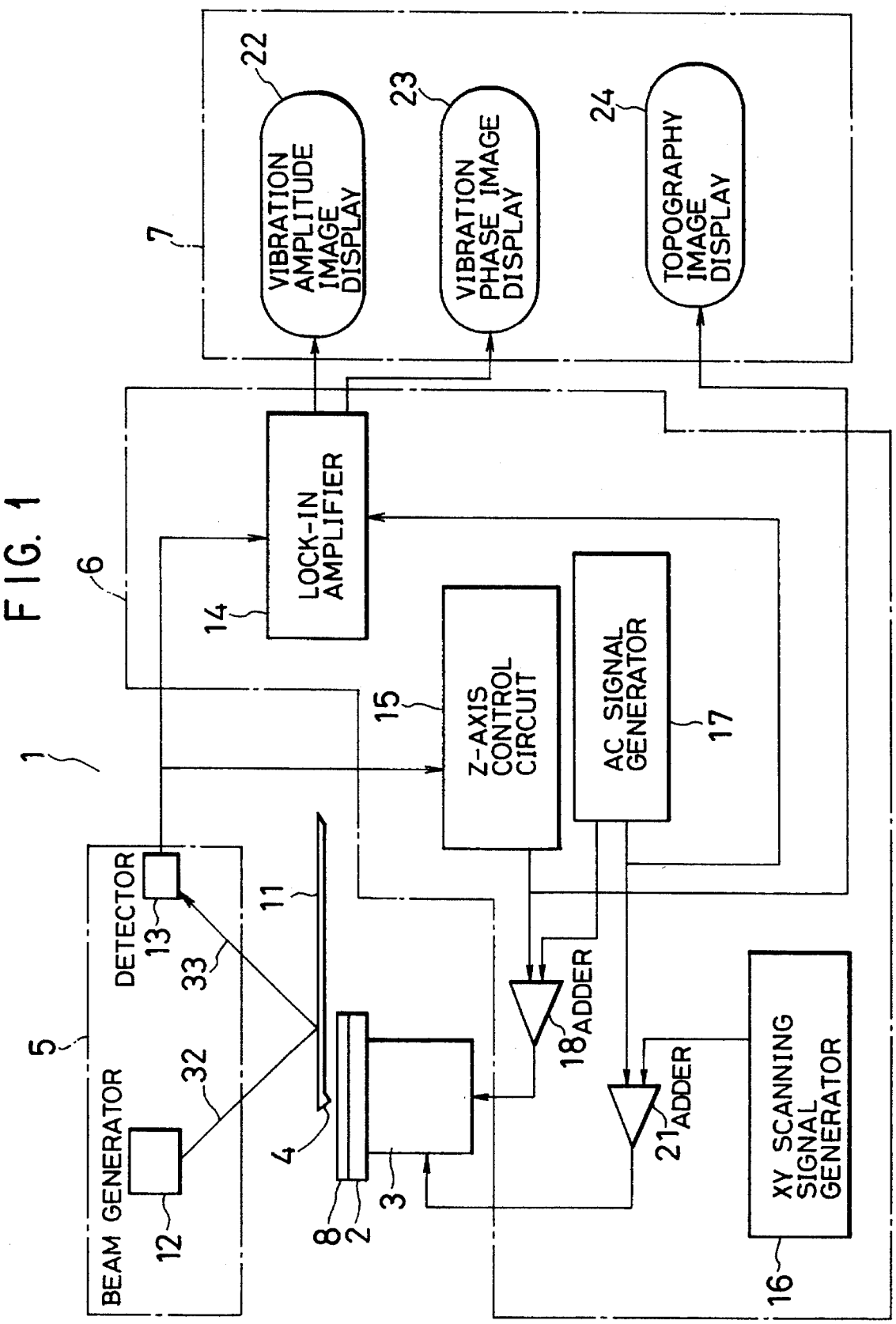
FIG. 1 is a block diagram of a directional atomic force microscope according to the invention.

The invention will now be explained with respect to an embodiment illustrated in the drawings. A directional atomic force microscope according to the invention is designated by reference numeral 1 in FIG. 1. The atomic force microscope 1 is equipped with a sample stage 2, a sample stage driver 3, a probe 4, a cantilever measuring instrument 5, a controller 6 and a display 7. A sample 8 can be mounted on the sample stage 2 and the sample stage 2 can be driven by the sample stage driver 3. As shown in FIG. 2, the sample stage driver 3 is equipped with a piezoelectric transducer 9 and an ultrasonic vibrator 10. Provision of the ultrasonic vibrator 10 is optional.

Figure 3:
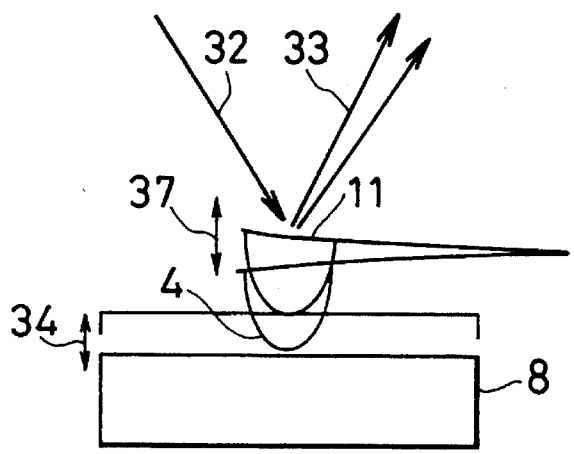
FIG. 3 is a diagram for explaining bending vibration of a cantilever of the microscope of FIG. 1.

As shown in FIG. 3, the piezoelectric transducer 9 is able to produce vertical vibration 34 in the sample 8. The bending vibration 37 induced in a cantilever 11 through the probe 4 owing to the vertical vibration of the sample 8 is detected as the ac component of a signal produced by an optical deflection detector 13, the amplitude and phase of the bending vibration 37 are measured by a lock-in amplifier 14, and an image of the vibration distribution is displayed by recording the measurement results as the sample is scanned two-dimensionally within an X-Y plane.

Figure 4:
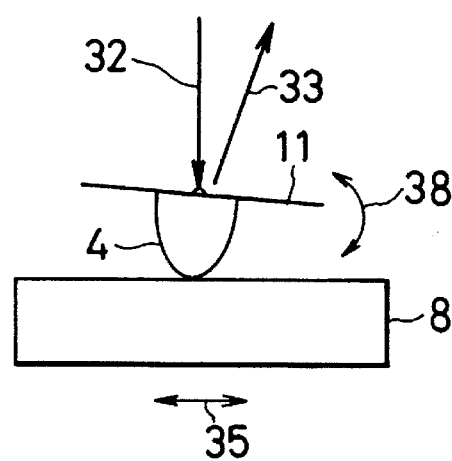
FIG. 4 is a diagram for explaining torsional vibration of the cantilever of the microscope of FIG. 1.

As shown in FIG. 4, the piezoelectric transducer 9 is also able to produce lateral vibration 35 in the sample 8. The torsional vibration 38 induced in the cantilever 11 owing to the lateral vibration of the sample 8 is detected as the ac component of a signal produced by the optical deflection detector 13, the amplitude and phase of the torsional vibration 38 are measured by the lock-in amplifier 14, and an image of the vibration distribution is displayed by recording the measurement results as the sample is scanned two-dimensionally within an X-Y plane.

The probe 4, which is supported on the tip of the cantilever 11, is positioned in contact with the sample 8. The cantilever measuring instrument 5 comprises a laser beam generator 12 and an optical deflection detector 13. The laser beam generator 12 directs a laser beam 32 onto the cantilever 11 and the optical deflection detector detects the reflected light 33 from the cantilever 11 for measuring the position and attitude of the cantilever 11. As the optical deflection detector 13 there can be used a position sensitive detector (PSD) divided into four (left, right, top, bottom) sectors.

The controller 6 is provided with the lock-in amplifier 14, a Z-axis control circuit 15, an XY scanning signal generator 16, an ac signal generator 17, an adder 18 and an adder 21. The display 7 includes a vibration amplitude image display 22, a vibration phase image display 23 and a topography image display 24. The Z-axis control circuit 15 receives the signal from the optical deflection detector 13 and outputs a control signal corresponding to the position and attitude of the cantilever 11 to the sample stage driver 3 for controlling the position of the sample stage 2 on the Z-axis (vertical axis). The XY scanning signal generator 16 produces and outputs to the sample stage driver 3 signals for operating the sample stage driver 3 in the X and Y directions. The lock-in amplifier 14 amplifies the output of the optical deflection detector 13 and forwards the amplified signal to the display 7. The amplified signal is also superimposed on the ac signal produced by the ac signal generator 17 and added to the signal from the XY scanning signal generator 16, and the resulting superimposed ac signal is added to the X-direction operation signal or the Y-direction operation signal in the adder 21 and then forwarded to the sample stage driver 3. Further, the ac signal produced by the ac signal generator 17 is added to the signal from the Z-axis control circuit 15 in the adder 18 and the result is forwarded to the sample stage driver 3. The vibration amplitude image display 22 and the vibration phase image display 23 of the display 7 receive the signal from the lock-in amplifier 14 and respectively display an image of the vibration amplitude and an image of the vibration phase of the cantilever 11. The topography image display 24 images the surface irregularities of the sample 8 based on the position and attitude of the cantilever 11.

The method of observing a sample with the atomic force microscope 1 of the foregoing configuration will now be explained.

The sample 8 is mounted on the sample stage 2 and the sample stage driver 3 is driven to vibrate vertically by the ac signal received from the ac signal generator 17 via the adder 18, whereby a vibrational force is produced between the sample 8 and the probe 4 in the normal direction. If at the same time the sample stage driver 3 is driven to vibrate in the X or Y direction by the ac signal received via the adder 21, the vibration between the sample 8 and the probe 4 is superimposed with vibration in the X direction or vibration in the Y direction and, as a result, the locus of the relative motion becomes a straight line, in which case its direction is controlled as shown in FIGS. 5(a) and 5(b), or becomes a ring, in which case it is a circle as shown in FIGS. 5(c) and 5(d) or an ellipse as shown in FIGS. 5(e) and 5(f).

When the surface irregularities of the sample are to be measured, the probe 4 is contacted with the sample 8 and bending deflection is induced in the cantilever 11 supporting the probe 4 as in the prior art atomic force microscope. If the sample 8 has surface irregularities, this bending deflection changes at different places thereon. These changes are measured by the optical deflection detector 13 as changes occurring in the vertical direction in the laser light reflected from the back of the cantilever 11 and the signal output by the optical deflection detector 13 is used to image the irregularities of the sample 8 on the topography image display 24.

When the friction of the sample is to be measured, the sample 8 is vibrated in the lateral direction 35 in FIG. 2 (e.g. perpendicular to the drawing sheet). As shown in FIG. 4, this induces torsional vibration in the cantilever 11 in accordance with the frictional force acting between the probe 4 and the sample 8. The optical deflection detector 13 measures the torsional vibration for enabling imaging of the distribution of the frictional force of the sample. If a vertical/lateral optical deflection detector divided into four (left, right, top, bottom) sectors is used as the optical deflection detector 13, the bending and torsion can be independently measured at the same time.

Measurement of the friction of a sample using the prior art lateral vibration atomic force microscope involves the use of reciprocating friction. As shown in FIG. 6, however, in this invention the superimposition on the lateral vibration of a vertical vibration differing in phase from the lateral vibration by 90 degrees causes the relative motion between the probe 4 and the sample 8 to assume an elliptical locus with a vertical axis in the X-Z plane or the Y-Z plane. As a result, the friction between the sample and the probe is not reciprocating but unidirectional.

In this case, it is possible to obtain different frictional forces when ascending and descending steps and, moreover, by monitoring the change in the vibration amplitude of the cantilever 11 with vibration frequency, to evaluate the time response characteristic of the friction.

Figure 7:
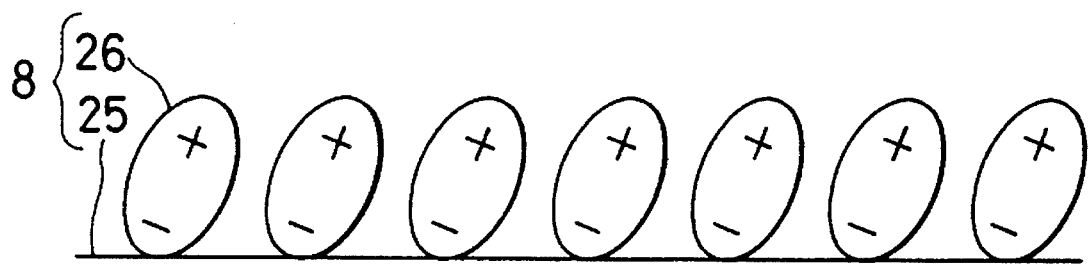
FIG. 7 is a diagram for explaining the orientation of sample molecules adsorbed on a substrate.
Figure 8:
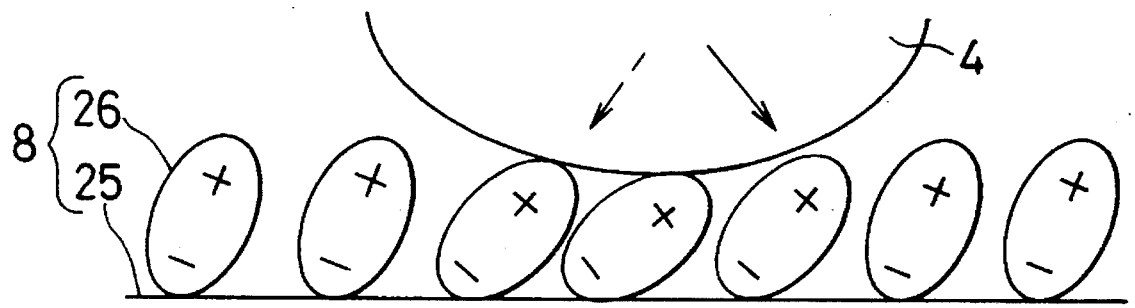
FIG. 8 is a diagram for explaining measurement of the angular dependence of the sample of FIG. 7.

In addition, there are cases in which the sample 8 deforms easily in response to a force acting in a specific direction but does not deform easily in other directions. This occurs, for example, when, as shown in FIG. 7, the sample 8 has a molecular system in which its molecules 25 are adsorbed on a substrate 26 in an overlapping orientation. The characteristics of this type of system cannot be investigated with the prior art vibration atomic force microscope which employs vibration in only one direction. With the directional vibration atomic force microscope according to this invention, however, it is possible to evaluate the angular elasticity of such a material by, as shown in FIG. 8, using a cantilever 11 with a spring constant smaller than that of the sample 8, contacting the probe 4 with the molecules 26, and successively changing the vibration direction from that indicated by the solid line arrow to that indicated by the broken line arrow. In FIG. 8, the solid line arrow indicates a force acting in the direction in which deformation is easy to produce and the broken line arrow indicates a force acting in the direction in which deformation is hard to produce.

Figure 9:
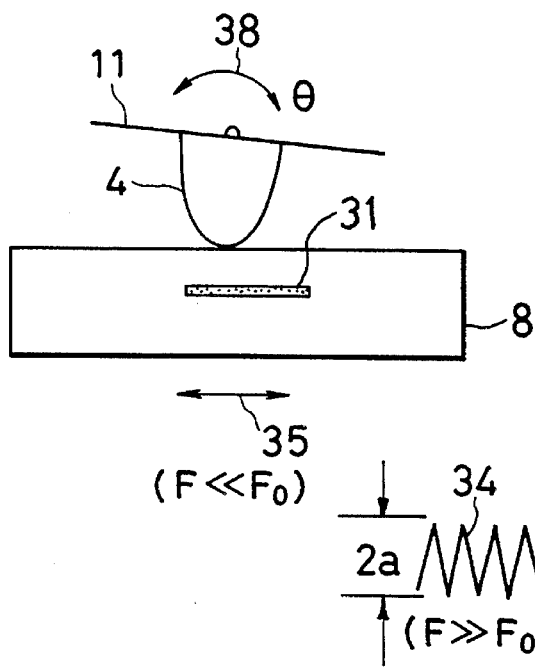
FIG. 9 is a diagram showing lateral vibration being imparted to a sample.
Figure 10:
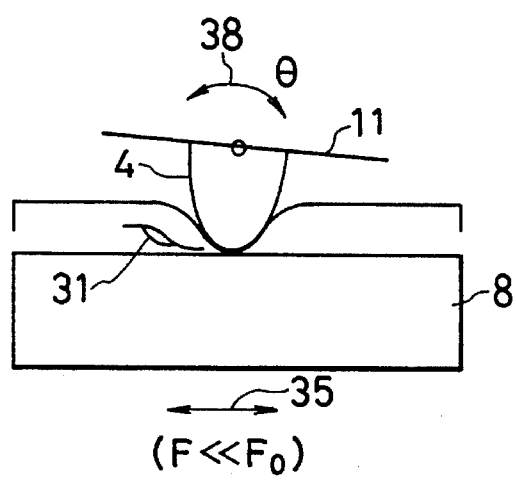
FIG. 10 is a diagram showing vertical vibration being imparted to a sample.
Figure 11:
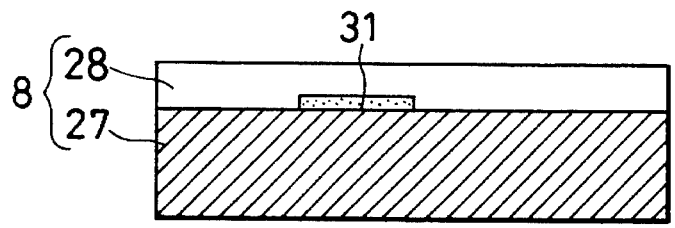
FIG. 11 is a diagram showing a sample with a delamination defect.
Figure 12:
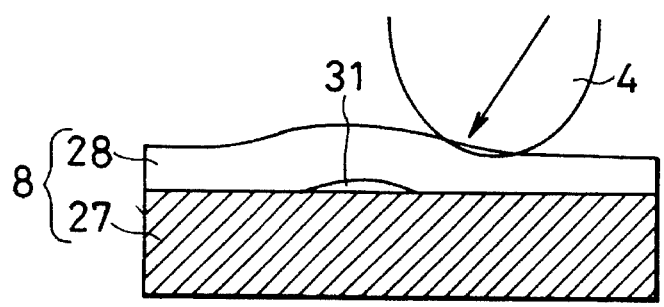
FIG. 12 is a diagram showing the state occurring when the sample of FIG. 11 is vibrated laterally to apply an oblique force thereto.

Imaging of an internal defect of a sample 8 will now be explained. When, as shown in FIG. 9, a cantilever 11 having a spring constant is brought into contact with the sample 8 and, in this state, lateral vibration 35 having a frequency F much lower than the resonant frequency $F_0$ of the cantilever 11 is imparted to the sample 8, the sample 8 produces a frictional force acting on the probe 4. As a result, torsional vibration 38 is induced in the cantilever 11. Since the portion of the sample 8 affected by this frictional force is limited to that in the vicinity of the outer surface thereof, even if an internal defect 31 should exist in the sample 8, it cannot be detected. However, when vertical vibration having an amplitude 2a and a frequency F much higher than the resonant frequency $F_0$ of the cantilever 11 is imparted to the sample 8, as shown in FIG. 10, the cantilever 11 cannot move owing to the inertia. As a result, the probe 4 forms an indentation in the sample 8. In this state, if lateral vibration 35 is imparted to the sample 8, a shearing strain can be produced in a surface layer of the sample of a thickness approximately equal to the depth of the indentation. If a delamination defect 31 should exist in the sample 8, therefore, the amplitude of the torsional vibration 38 of the cantilever 11 differs between the portions where the defect 31 is present and where it is not. Owing to this difference, the defect 31 can be imaged. If, as shown in FIG. 11, the sample 8 consists of a substrate material 27 overlaid with a coating layer 28, for example, elastic deformation can be produced in the sample 8 by using a cantilever 11 with a spring constant about the same as or larger than the sample 8 (specifically, the coating layer 28). In particular, when, as shown in FIG. 11, the sample 8 has a delamination or other internal defect 31 which reduces its compliance with respect to lateral stress, it is possible to impart lateral vibration to the sample 8 for causing an oblique force to act on the sample 8 and, by controlling the direction of this force, to maximize the difference in the cantilever vibration response between the portions where the defect 31 is present and where it is not.

There will now be explained a specific example of the observation of a sample imparted with lateral and vertical vibration.

Figure 2:
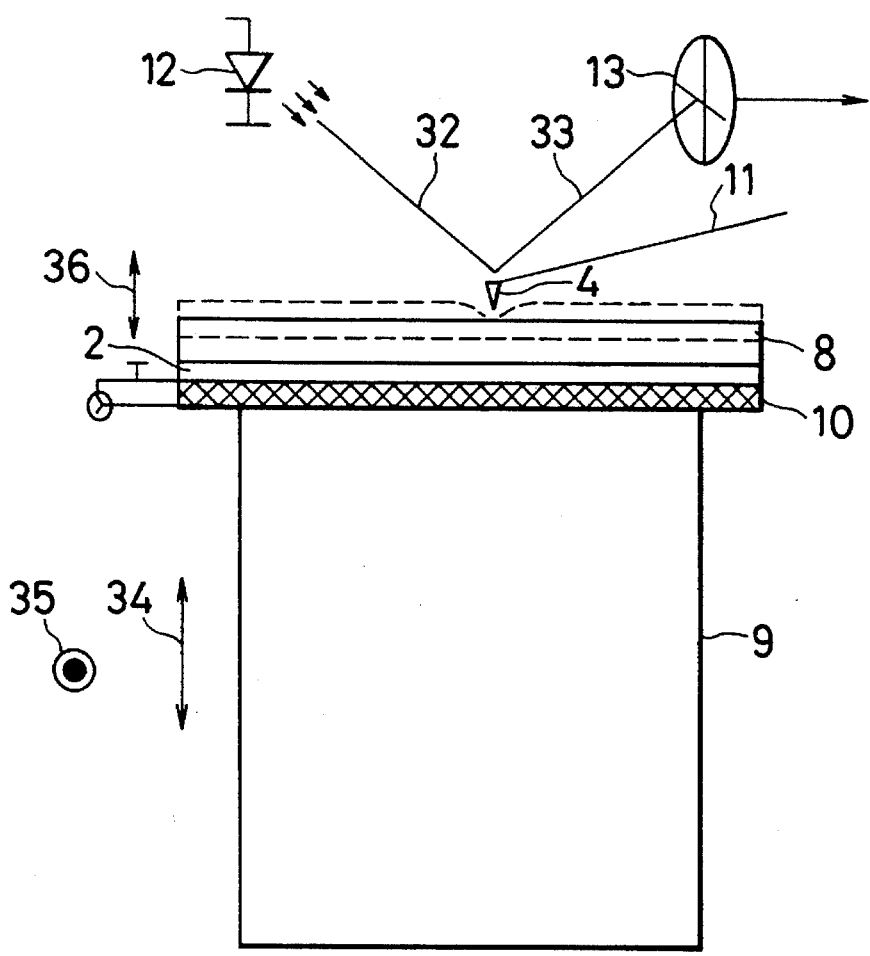
FIG. 2 is an enlarged schematic view of the sample stage driver of the microscope of FIG. 1.

The atomic force microscope 1 shown in FIG. 1 was used. An ultrasonic vibrator bonded to the sample table was operated for imparting 5.6 MHz ultrasonic vibration to the sample. A 400-nm-thick silicon nitride cantilever having a spring constant of 0.09 N/m and a resonant frequency of 40 kHz was used. The sample was a graphite single crystal.

Figure 13:
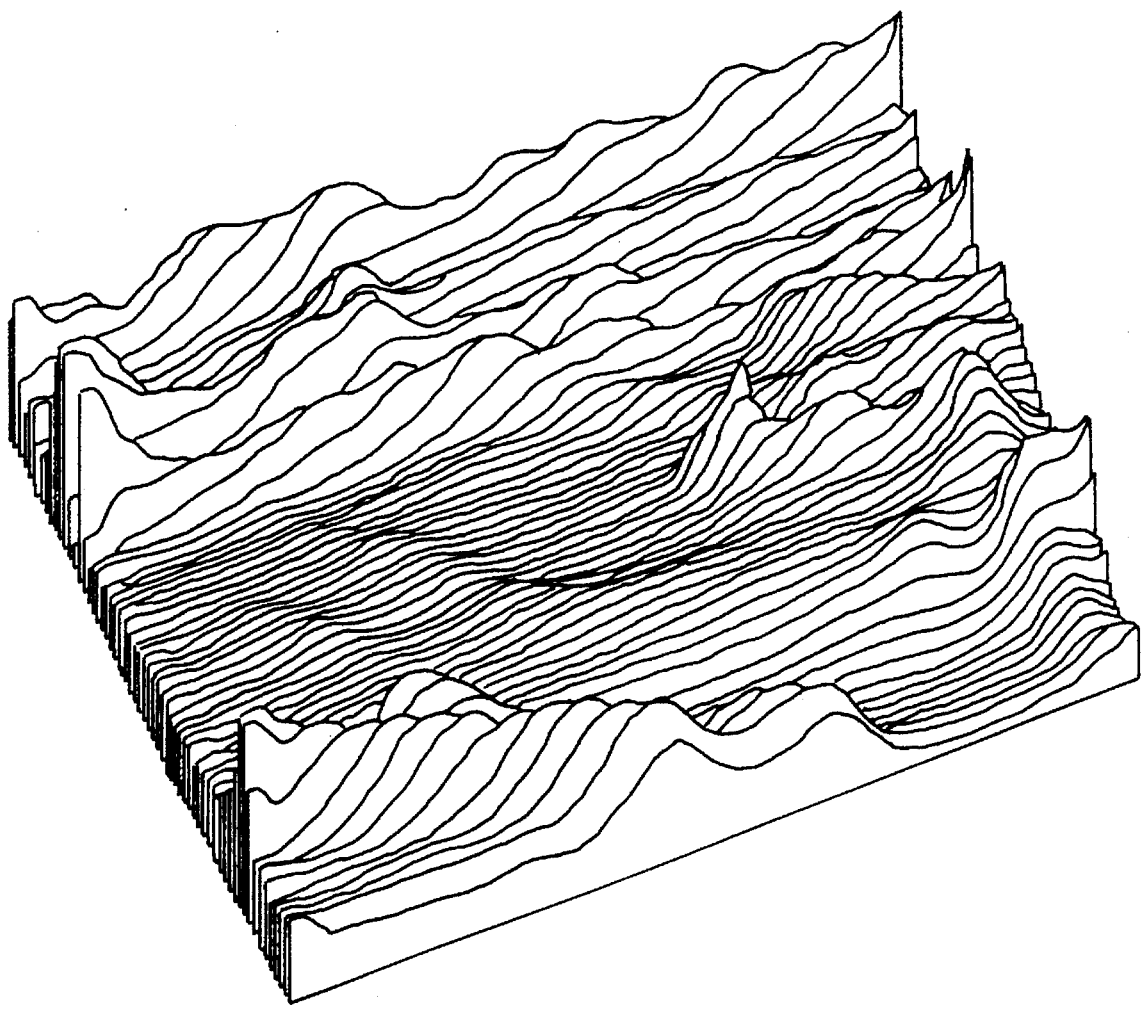
FIG. 13 is a distribution diagram showing the amplitude of torsional vibration of the cantilever when low-frequency lateral vibration is imparted to a graphite single crystal sample.

When lateral vibration was imparted to the sample at a small amplitude that did not cause slipping, the resulting frictional force produced torsional vibration in the cantilever, as shown in FIG. 9. The distribution of the torsional vibration is shown in FIG. 13. The fine steps seen in this figure are the result of a slope exaggeration effect. When the probe was indented into the sample by the ultrasonic vibration with the cantilever in a twisted state, torsion torque was produced with respect to the cantilever (FIG. 10). This torsion torque was affected not only by the surface friction but also by the shear elasticity of the whole surface layer. Therefore, by measuring the torsional vibration 38, it was possible to image features which change the shear elasticity, such as delaminations and dislocations. FIG. 14 shows the distribution of the torsional vibration in this case. Here the fine steps are further exaggerated and pronounced stringlike features A, B, C and D not observable in FIG. 13 can be seen. These are thought to be dislocations that change the subsurface shear elasticity. Their observation is an effect obtained by the imparting of the directionally controlled vibration to the cantilever.

Since the prior art vibration atomic force microscope and the tunneling acoustic microscope subject the sample only to forces normal thereto, measurement of viscoelastic anisotropy and the imaging of internal defects with these microscopes enables imaging of only voids and other internal structures which change the apparent elasticity in the vertical direction. However, cracks, delaminated portions of the coating and the like are not dislocated unless a shearing force is added to the normal force. Moreover, as is seen in obliquely oriented liquid crystal, for example, a large compliance is often exhibited three-dimensionally in a specific direction. The prior art vibration mode limited to the vertical direction is therefore inadequate when measurement is to be extended to such samples. In accordance with the present invention, however, it is possible to image internal structures which easily deform in a specific direction and to evaluate viscoelastic behavior. Owing to these capabilities, the invention is able to contribute to the improvement measurement and imaging accuracy as well as to more precise understanding in a wide range of fields including evaluation of the viscoelasticity of cells and liquid crystals for use in displays, analysis of processing defects in integrated circuits, and detection of processing cracks in fine ceramics.

The invention also makes a contribution to the evaluation of frictional force. Factors involved in producing frictional force include monolayers, the minute irregularities thereunder, the viscoelasticity of atoms/molecules adsorbed on the surface, and the like. Thus the time response and directionality of friction provide valuable clues for the analysis of this highly complex phenomenon. Although time response evaluation is impossible with the friction force microscope of Mate et al., it is possible in principle with the lateral vibration friction force microscope of O'Shea et al. if the frequency is varied. Since contact is maintained in both directions, however, the vibration is suppressed if the frequency is high. In contrast, in the case of the directional vibration according to the present invention, torsional deflection is induced if the frictional force is large in one direction. Thus a dc response is obtained even at high frequencies and it is possible to evaluate the frictional force from the magnitude thereof.

The invention can therefore be effectively applied for evaluating the friction characteristics and service life of magnetic heads and lubricating materials.

What is claimed is:

1. A directional atomic force microscope comprising:
   a sample stage,
   sample stage driving means for imparting vertical and lateral vibrations to the sample stage;
   a probe for contacting a sample mounted on the sample stage;
   a cantilever supporting the probe at its tip and adapted to scan the sample surface;
   a laser beam generating means for directing a laser beam onto the cantilever;
   an optical deflection detector for receiving laser beam light reflected from the cantilever;
   a controller for receiving an output signal from the optical deflection detector and outputting a control signal to the sample stage driving means; and
   a display for imaging vibration-and-friction force distribution and the shear elasticity of the sample on a basis of the output control signal from the controller.

2. A microscope according to claim 1, wherein the sample stage driving means is a piezoelectric transducer and the sample is imparted with controlled vibration in the lateral direction and the vertical direction.

3. A microscope according to claim 1, wherein the sample stage driving means is a piezoelectric transducer and an ultrasonic vibrator and the sample is imparted with controlled vibrations in the lateral direction and the vertical direction.

4. In an atomic force microscope for imaging irregularities at a minute region of a sample based on force acting between the sample and a probe, a method of observing a sample with an atomic force microscope comprising the steps of
   imparting phase-controlled vertical and lateral vibration to one or both of a sample and a probe for producing vibration resulting in relative motion between the probe and the sample whose locus is a straight line or a ring,
   controlling the direction of the straight line or the major axis of the ring, and
   concurrently measuring one or both of the amplitude and the phase of one or both of the bending vibration and the torsional vibration of a cantilever excited by the vibration.

5. In an atomic force microscope for measuring local features by measuring force acting between the sample and a probe, a method of observing a sample with an atomic force microscope according to claim 4, wherein a device is provided for imparting the sample with vertical vibration in the probe direction and lateral vibration perpendicular thereto, the device is operated for simultaneously producing vertical vibration and lateral vibration in the sample for inducing torsional deflection or torsional vibration in the probe or the cantilever supporting the probe, the torsional deflection or torsional vibration is measured, and the measurement result is used to produce an image reflecting the frictional force and the shear elasticity of the sample.

6. A method of observing a sample with an atomic force microscope according to claim 5, wherein the relative phase between the vertical vibration and the lateral vibration are adjusted for producing elliptical motion of the sample in a vertical plane, the sample and the probe are made to contact each other at a single point on the locus of the elliptical motion during each cycle thereof, thereby producing a torsional vibration in the cantilever whose magnitude is a function of the frictional force between the sample and the probe, the frictional force is determined by measuring the amplitude or phase of the torsional vibration, and the distribution of the frictional force is imaged.

7. A method of observing a sample with an atomic force microscope according to claim 5, wherein a large compressive force is produced between the probe and the sample by using a cantilever with high rigidity or vertically vibrating the sample at a frequency much higher than the resonant frequency of the cantilever, torsional vibration dependent on the magnitude of the shear elasticity of the sample is induced in the cantilever by imparting lateral vibration to the sample while the large compressive force is being produced, the shear elasticity is determined by measuring the amplitude or phase of the torsional vibration and the distribution of the shear elasticity is imaged.

8. A directional atomic force microscope comprising:

a sample stage;

a sample stage driving means including a piezoelectric transducer and an ultrasonic vibrator and imparting controlled lateral and vertical vibrations to the sample;

a probe for contacting a sample mounted on the sample stage;

a cantilever supporting the probe at its tip and adapted to scan the sample surface;

laser beam generating means for directing a laser beam onto the cantilever;

an optical deflection detector for receiving laser beam light reflected from the cantilever;

a controller for receiving an output signal from the optical deflection detector and outputting a control signal to the sample stage driving means; and a display for imaging the vibration-and-friction force distribution and the shear elasticity of the sample on the basis of the output control signal from the controller.

9. In an atomic force microscope for imaging irregularities at a minute region of a sample based on a force acting between the sample and a probe, a method of observing a sample with an atomic force microscope, comprising the steps of:

bringing a probe supported on a cantilever into contact with a sample and vertically vibrating the sample at a frequency much higher than the resonant frequency of the cantilever to produce a large compressive force between the probe and the sample, for elastically pushing the probe into the sample;

imparting lateral vibration to the sample while keeping the probe pushed elastically into the sample, for inducing in the cantilever torsional vibration depending on the magnitude of the shear elasticity of the sample;

measuring the amplitude or phase of the torsional vibration, for determining the shear elasticity; and imaging the distribution of the shear elasticity.

* * * * *

UNITED STATES PATENT AND TRADEMARK OFFICE
CERTIFICATE OF CORRECTION

PATENT NO. : 5,503,010
DATED : April 2, 1996
INVENTOR(S) : Kazushi YAMANAKA

It is certified that error appears in the above-indentified patent and that said Letters Patent is hereby corrected as shown below:

On the title page, Item [73], Assignee, should read as follows:

--[73] Assignee: Agency of Industrial Science & Technology, Ministry of International Trade & Industry, Tokyo, Japan--

Signed and Sealed this

Eighteenth Day of June, 1996

*Attest:*

BRUCE LEHMAN

*Attesting Officer*    *Commissioner of Patents and Trademarks*

REEXAMINATION CERTIFICATE (3556th)
United States Patent [19]

Yamanaka

[11] B1 5,503,010
[45] Certificate Issued Jun. 23, 1998

[54] DIRECTIONAL ATOMIC FORCE MICROSCOPE AND METHOD OF OBSERVING A SAMPLE WITH THE MICROSCOPE

[75] Inventor: Kazushi Yamanaka, Tsukuba, Japan

[73] Assignees: Agency of Industrial Science & Technology; Ministry of International Trade & Industry, both of Tokyo, Japan

Reexamination Request:
No. 90/004,670, Jun. 6, 1997

Reexamination Certificate for:
Patent No.: 5,503,010
Issued: Apr. 2, 1996
Appl. No.: 338,179
Filed: Nov. 9, 1994

Certificate of Correction issued Jun. 18, 1996.

[30] Foreign Application Priority Data

Nov. 9, 1993 [JP] Japan ................................. 5-303518

[51] Int. Cl.$^6$ ................................................. G01B 5/28
[52] U.S. Cl. ................................................................ 73/105
[58] Field of Search ........................... 73/105; 250/306, 250/307

[56] References Cited

U.S. PATENT DOCUMENTS 5,193,383  3/1993  Burnham et al. ........................ 73/105

OTHER PUBLICATIONS van der Werf et al., "Compact Stand–Alone Force Microscope", Rev. Sci. Instrum., vol. 64, No. 10, Oct. 1993, pp. 2892–2897.

Burnham et al., "Measuring the Nanomechanical Properties and Surface Forces of Materials Using an Atomic Force Microscope", J. Vac. Sci. Technol. A., vol. 7, No. 4, Jul./Aug. 1989, pp. 2906–2913.

Hipp et al., "A Stand–Alone Scanning Force and Friction Microscope", Ultramicroscopy, vol. 42–44, 1992, pp. 1498–1503.

Meyer et al., "Simultaneous Measurement of Lateral and Normal Forces with an Optical–Beam–Deflection Atomic Force Microscope", Appl. Phys. Lett., vol. 57, No. 20, 12 Nov. 1990, pp. 2089–2091.

Cretin et al. "Scanning Microdeformation Microscopy", Appl. Phys. Lett., vol. 62, No. 8, 22 Feb. 1993, pp. 829–831.

Takata et al., "Tunneling Acoustic Microscope", Appl. Phys. Lett., vol. 55, No. 17, 23 Oct. 1989, pp. 1718–1720.

Mate et al., "Atomic–Scale Friction of a Tungsten Tip on a Graphite Surface", Physical Review Letters, vol. 59, No. 17, 26 Oct. 1987, pp. 1942–1945.

O'Shea et al., "Atomic Force Microscope Study of Boundary Layer Lubrication", Appl. Phys. Lett., vol. 61, No. 18, 02 Nov. 1992, pp. 2240–2242.

Radmacher et al., "From Molecules to Cells: Imaging Soft Samples with the Atomic Force Microscope", Science, vol. 257, 25 Sep. 1992, pp. 1900–1905.

Maivald et al., "Using Force Modulation to Image Surface Elasticities with the Atomic Force Microscope", Nanotechology, vol. 2, 1991, pp. 103–106.

Martin et al., "Atomic Force Microscope–Force Mapping and Profiling on a Sub 100–A Scale", Appl. Phys. Lett., vol. 61, No. 10, 15 May 1987, pp. 4723–4729.

Binning et al., "Atomic Force Microscope", Physical Review Letters, vol. 56, No. 9, 03 Mar. 1986, pp. 930–933.

(List continued on next page.)

*Primary Examiner*—Hezron E. Williams

[57] ABSTRACT

An atomic force microscope includes a vibrator which imparts vibration between a probe and a sample such that a relative vertical vibration and a relative lateral vibration are superimposed. A method of observing a sample with the microscope includes the steps of imparting phase-controlled vertical and lateral vibration between a sample and a probe so that the probe moves along a straight line or a ring relative to the sample, controlling the direction of the straight line or the ring, and measuring the amplitude and/or the phase of the bending vibration and/or the torsional vibration of a cantilever excited by the vibration.

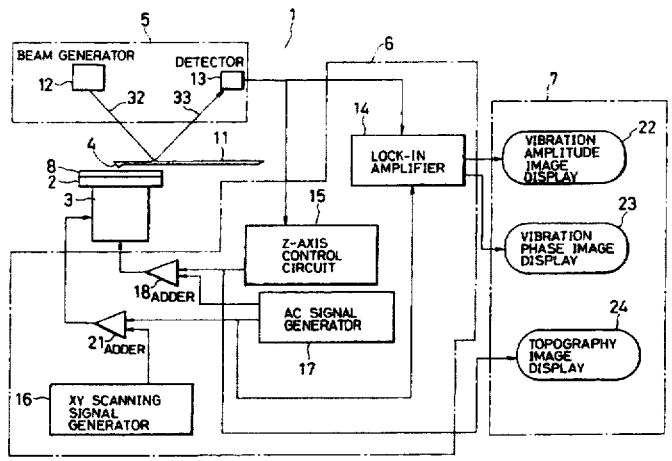

OTHER PUBLICATIONS

The Acoustic Soc. Of Japan, Atomic Force Microscope Using Lateral Vibration of Sample by K. Yamanaka, O.V. Kolosov, H. Ogiso, H. Sato and T. Koda, pp. 889–890, Mar. 17, 1993.

The Meeting of Mechanical Engineering Laboratory, Observation of Low–Friction Contamination on Vapor–Deposited Gold Film with Atomic Force Microscope Using Lateral Virbation of Sample by K. Yamanaka, O.V. Kolosov, H. Ogiso, H. Sato, Y. Nagata and T. Koda, p. 22, May 12, 1993.

Nonlinear Detection of Ultrasonic Vibrations in an Atomic Force Microscope by Oleg Kolosov and Kazushi Yamanaka (Mechanical Engineering Laboratory, Namiki 1–2, Tsukuba, Ibaraki 305) Reprinted from Japan J. Appl. Phys. vol. 32 (1993) pp. L1095–L1098 Part 2, No. 8A, Aug. 1, 1993.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–9 is confirmed.

* * * * *